United States Patent
Holley et al.

[11] Patent Number: 6,029,391
[45] Date of Patent: Feb. 29, 2000

[54] HANDS-FREE FISHING SYSTEM

[76] Inventors: Randal Holley; Lisa Holley, both of HC 70 Box 224A, Ardmore, Okla. 73401

[21] Appl. No.: 09/109,711

[22] Filed: Jul. 2, 1998

[51] Int. Cl.[7] ............................ A01K 89/08; A01K 93/00
[52] U.S. Cl. .................................. 43/43.11; 43/4; 43/43.1; 242/390.8; 242/405.2
[58] Field of Search ..................................... 43/43.1, 27.4, 43/57.3, 4, 4.5, 44.87, 44.9, 43.11; 242/390.8, 405.2

[56] References Cited

U.S. PATENT DOCUMENTS

| | | | |
|---|---|---|---|
| 779,937 | 1/1905 | Holt | 43/43.11 |
| 1,175,968 | 3/1916 | Meiners | 43/43.11 |
| 1,902,393 | 3/1933 | Bosch | 43/44.96 |
| 2,644,266 | 7/1953 | Updegrove | 43/44.96 |
| 2,795,077 | 6/1957 | John | 43/43.11 |
| 2,888,773 | 6/1959 | Hudkins | 43/43.11 |
| 2,917,861 | 12/1959 | Hines | 43/44.96 |
| 2,924,039 | 2/1960 | Morton | 43/43.11 |
| 3,010,238 | 11/1961 | Crumrine, Jr. et al. | 43/43.11 |
| 3,216,146 | 11/1965 | Johnson et al. | 43/27.4 |
| 3,323,247 | 6/1967 | Murray | 43/17 |
| 3,599,370 | 8/1971 | Armata et al. | 43/27.4 |
| 4,290,584 | 9/1981 | Eckels et al. | 242/390.8 |
| 4,453,843 | 6/1984 | Martyniuk | 43/57.3 |
| 4,484,405 | 11/1984 | Woods | 43/4.5 |
| 4,501,564 | 2/1985 | Cairone, Sr. | 43/43.1 |
| 4,569,146 | 2/1986 | Lowrance | 43/4 |
| 4,571,878 | 2/1986 | Nyman | 43/43.11 |
| 4,574,515 | 3/1986 | Garner | 43/43.11 |
| 4,601,126 | 7/1986 | Klicksiem | 43/43.11 |
| 4,607,449 | 8/1986 | Brachear | 43/43.11 |
| 4,672,769 | 6/1987 | Thompson | 43/43.11 |
| 4,693,030 | 9/1987 | Wohead | 43/43.1 |
| 4,778,422 | 10/1988 | Saulnier et al. | 43/43.1 |
| 4,825,580 | 5/1989 | Gray | 43/44.9 |
| 4,858,369 | 8/1989 | Collins | 43/43.1 |
| 4,887,777 | 12/1989 | Rasmussen | 242/390.8 |
| 4,915,320 | 4/1990 | Neal | 242/390.8 |
| 4,951,890 | 8/1990 | Sossamon | 242/390.8 |
| 5,005,310 | 4/1991 | Rinehart | 43/44.9 |
| 5,033,225 | 7/1991 | Waldroop et al. | 43/43.11 |
| 5,048,219 | 9/1991 | Georgescu | 43/4 |
| 5,071,085 | 12/1991 | Beers | 242/390.8 |
| 5,190,237 | 3/1993 | Fagan | 242/390.8 |
| 5,207,013 | 5/1993 | Bartok et al. | 43/4 |
| 5,224,284 | 7/1993 | Kelsey et al. | 43/17 |
| 5,235,776 | 8/1993 | Backus | 43/43.11 |
| 5,253,445 | 10/1993 | Spoonemore | 43/44.87 |
| 5,265,369 | 11/1993 | Botkins | 43/43.11 |
| 5,277,350 | 1/1994 | Thornbury, Jr. | 242/390.8 |
| 5,345,709 | 9/1994 | Cummings et al. | 43/57.3 |
| 5,376,035 | 12/1994 | Forrest | 242/390.8 |
| 5,449,308 | 9/1995 | Thompson | 242/390.8 |
| 5,819,465 | 10/1998 | Bryant | 43/43.11 |
| 5,906,067 | 5/1999 | Layson | 43/4 |

FOREIGN PATENT DOCUMENTS

| | | | |
|---|---|---|---|
| 4-187040 | 7/1992 | Japan | 43/43.1 |
| 96741 | 9/1960 | Norway | 43/43.11 |
| 57415 | 9/1924 | Switzerland | 43/57.3 |
| 1642970 | 4/1991 | U.S.S.R. | 43/43.1 |
| 1642971 | 4/1991 | U.S.S.R. | 43/43.1 |

*Primary Examiner*—Michael J. Carone
*Assistant Examiner*—Darren W. Ark

[57] ABSTRACT

A hands-free fishing system is provided including at least one fishing unit. Each fishing unit includes a float and a string having a first end connected to the float adjacent to one of a pair of ends thereof. A weight is mounted to a second end of the string. At least one hook is coupled between the first end and second end of the string.

12 Claims, 2 Drawing Sheets

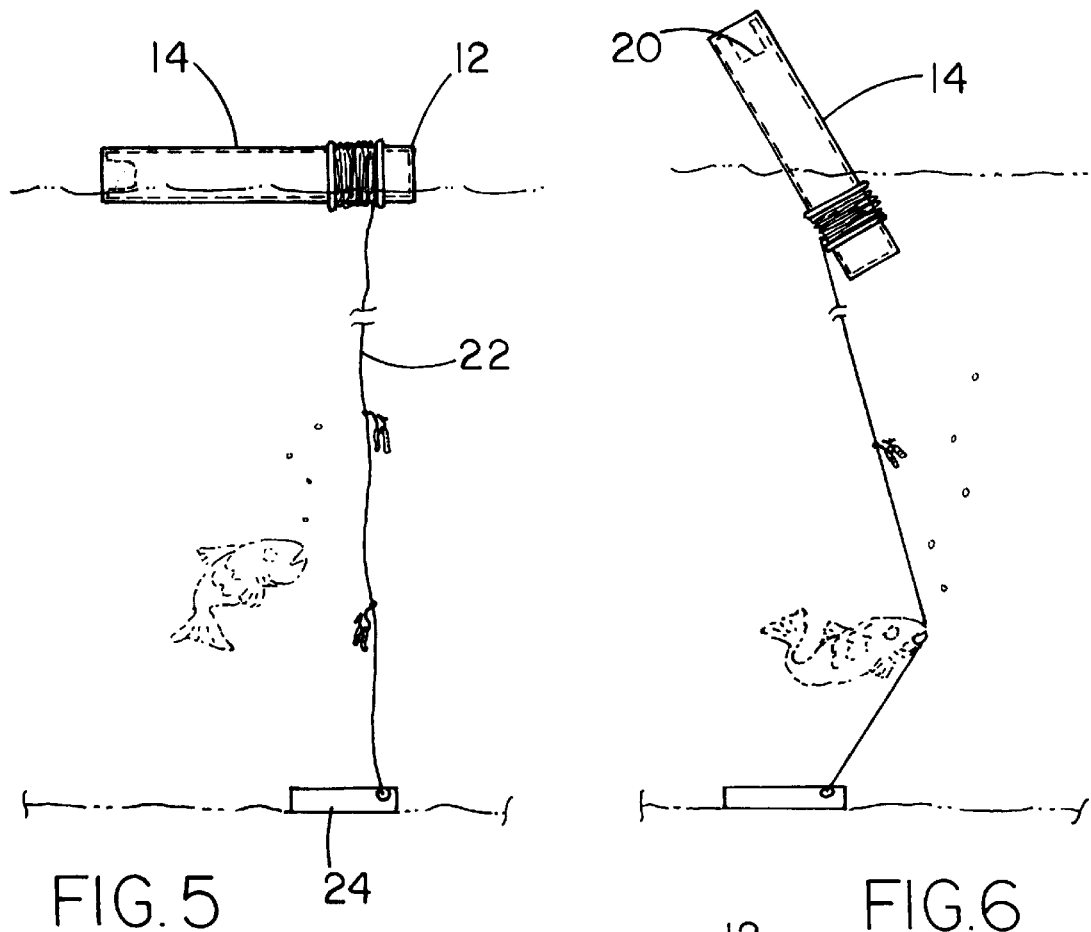
FIG. 5
FIG. 6
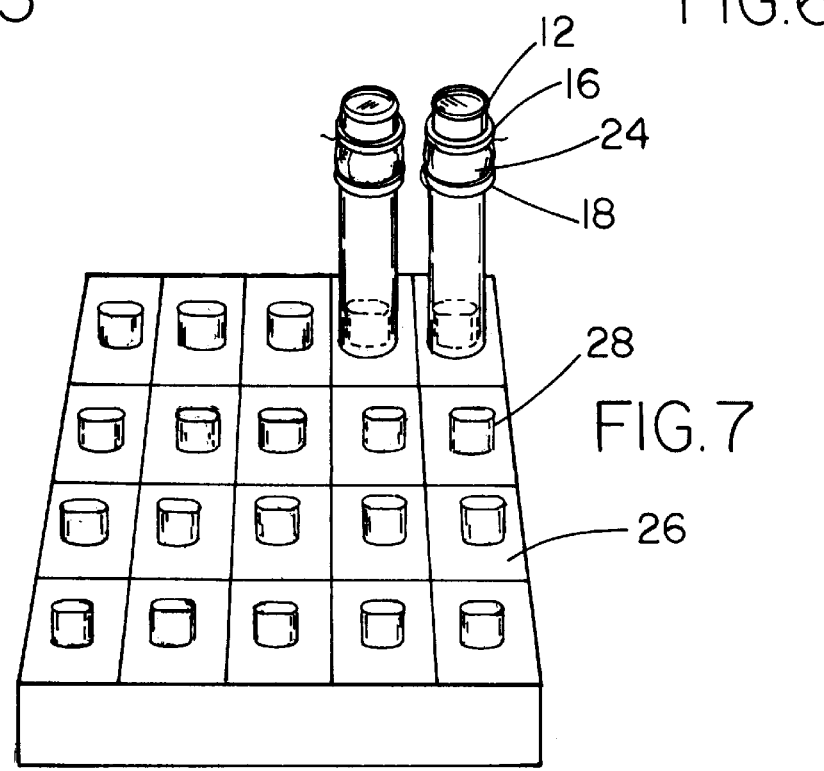
FIG. 7

HANDS-FREE FISHING SYSTEM

BACKGROUND OF THE INVENTION

1. Field of the Invention

The present invention relates to fishing bobbers and more particularly pertains to a new hands-free fishing system for providing a plurality of floating fishing units which indicate a fish strike from afar.

2. Description of the Prior Art

The use of fishing bobbers is known in the prior art. More specifically, fishing bobbers heretofore devised and utilized are known to consist basically of familiar, expected and obvious structural configurations, notwithstanding the myriad of designs encompassed by the crowded prior art which have been developed for the fulfillment of countless objectives and requirements.

Known prior art fishing bobbers include U.S. Pat. Nos. 5,207,013; 3,323,247; 4,672,769; 2,795,077; 5,224,284; and U.S. Pat. No. 5,235,776.

In these respects, the hands-free fishing system according to the present invention substantially departs from the conventional concepts and designs of the prior art, and in so doing provides an apparatus primarily developed for the purpose of providing a plurality of floating fishing units which indicate a fish strike from afar.

SUMMARY OF THE INVENTION

In view of the foregoing disadvantages inherent in the known types of fishing bobbers now present in the prior art, the present invention provides a new hands-free fishing system construction wherein the same can be utilized for providing a plurality of floating fishing units which indicate a fish strike from afar.

The general purpose of the present invention, which will be described subsequently in greater detail, is to provide a new hands-free fishing system apparatus and method which has many of the advantages of the fishing bobbers mentioned heretofore and many novel features that result in a new hands-free fishing system which is not anticipated, rendered obvious, suggested, or even implied by any of the prior art fishing bobbers, either alone or in any combination thereof.

To attain this, the present invention generally comprises a plurality of fishing units. As shown in FIG. 1, each fishing unit includes a float with a cylindrical configuration having a pair of closed end faces and a peripheral side wall formed therebetween.

In the preferred embodiment, the float is formed of a hollow metallic material having a protective elastomeric layer formed thereon. As shown in FIG. 1, each float further includes a first annular flange integrally coupled to the peripheral side wall adjacent to a first end face of the float. Associated therewith is a second annular flange integrally coupled to the peripheral side wall of the float between a center point of the float and the first annular flange. As such, a spool is defined. For reasons that will soon become apparent, a generally rectangular recess is formed in a second end face of the float. It should be noted that a length of the float is at least 5 times a diameter thereof. Next provided is a string having a first end connected to the float between the annular flanges. In use, the string is adapted for being reeled about the spool of the float. A weight is included having a planar rectangular configuration. A periphery of the weight is defined by a pair of short end edges with a width equal to that of the spool. Further, a pair of side edges of the periphery of the weight are each equipped with a length equal to a circumference of the float. As shown in FIG. 3, the weight has a hole formed therein adjacent to one of the end edges thereof for being coupled to a second end of the string. The weight is suitably constructed from a deform able lead material. In operation, the weight serves for maintaining the second end of the string on a floor of a body of water when the string is unreeled. Further, the weight serves for being wrapped about the string when reeled about the spool for maintaining the same in place. As shown in FIGS. 5 & 6, a plurality of hooks are spacedly coupled along a length of the string.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hands-free fishing system apparatus and method which has many of the advantages of the fishing bobbers mentioned heretofore and many novel features that result in a new hands-free fishing system which is not anticipated, rendered obvious, suggested, or even implied by any of the prior art fishing bobbers, either alone or in any combination thereof.

It is another object of the present invention to provide a new hands-free fishing system which may be easily and efficiently manufactured and marketed.

It is a further object of the present invention to provide a new hands-free fishing system which is of a durable and reliable construction.

An even further object of the present invention is to provide a new hands-free fishing system which is susceptible of a low cost of manufacture with regard to both materials and labor, and which accordingly is then susceptible of low prices of sale to the consuming public, thereby making such hands-free fishing system economically available to the buying public.

Still yet another object of the present invention is to provide a new hands-free fishing system which provides in the apparatuses and methods of the prior art some of the advantages thereof, while simultaneously overcoming some of the disadvantages normally associated therewith.

Still another object of the present invention is to provide a new hands-free fishing system for providing a plurality of floating fishing units which indicate a fish strike from afar.

Even still another object of the present invention is to provide a new hands-free fishing system that includes at least one fishing unit. Each fishing unit includes a float and a string having a first end connected to the float adjacent to one of a pair of ends thereof. A weight is mounted to a second end of the string. At least one hook is coupled between the first end and second end of the string.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a side view of the present invention in use.

FIG. 6 is another side view of the present invention in use.

FIG. 7 is an illustration of the tray of the present invention.

DESCRIPTION OF THE PREFERRED EMBODIMENT

Figure 1:
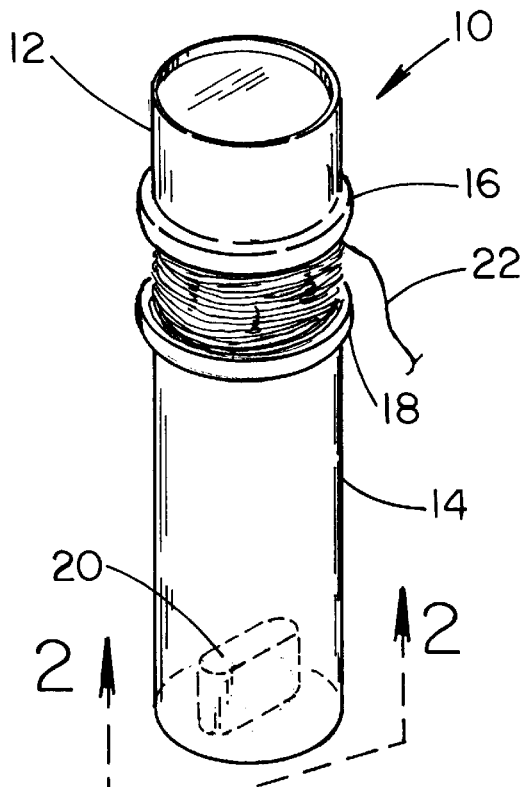
FIG. 1 is a perspective view of a new hands-free fishing system according to the present invention.
Figure 2:
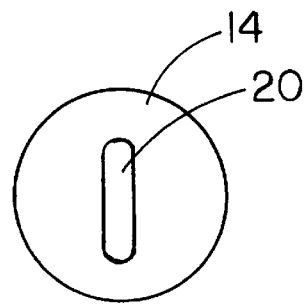
FIG. 2 is an end view of the present invention.

With reference now to the drawings, and in particular to FIGS. 1 through 7 thereof, a new hands-free fishing system embodying the principles and concepts of the present invention and generally designated by the reference numeral 10 will be described.

The present invention, designated as numeral 10, includes a plurality of fishing units 12. As shown in FIG. 1, each fishing unit includes a float 14, or jug, with a cylindrical configuration having a pair of closed end faces and a peripheral side wall formed therebetween. In the preferred embodiment, the float is formed of a hollow metallic material having a fluorescent protective elastomeric layer formed thereon. Further, it is preferred that the floats of each fishing unit have a constant diameter along an entire length thereof.

As shown in FIG. 1, each float further includes a first annular flange 16 integrally coupled to the peripheral side wall adjacent to a first end face of the float. Associated therewith is a second annular flange 18 integrally coupled to the peripheral side wall of the float between a center point of the float and the first annular flange. As such, a spool is defined. For reasons that will soon become apparent, a generally rectangular recess 20 is formed in a second end face of the float. It should be noted that a length of the float is at least 5 times a diameter thereof. Ideally, the float has a length of about 16 inches and a diameter of about 3 inches. Further, a width of each flange is about ½ of an inch and the spool is spaced from the first end face of the float a distance equal the width of the spool, approximately 2 and ¾ inches.

Figure 3:
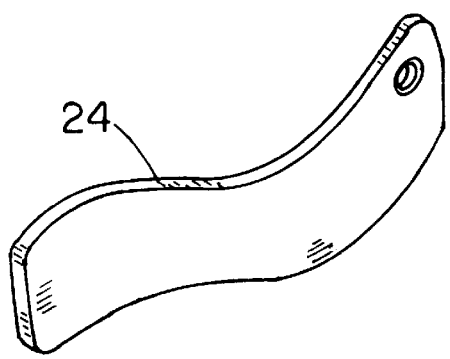
FIG. 3 is a perspective of the weight of the present invention.
Figure 4:
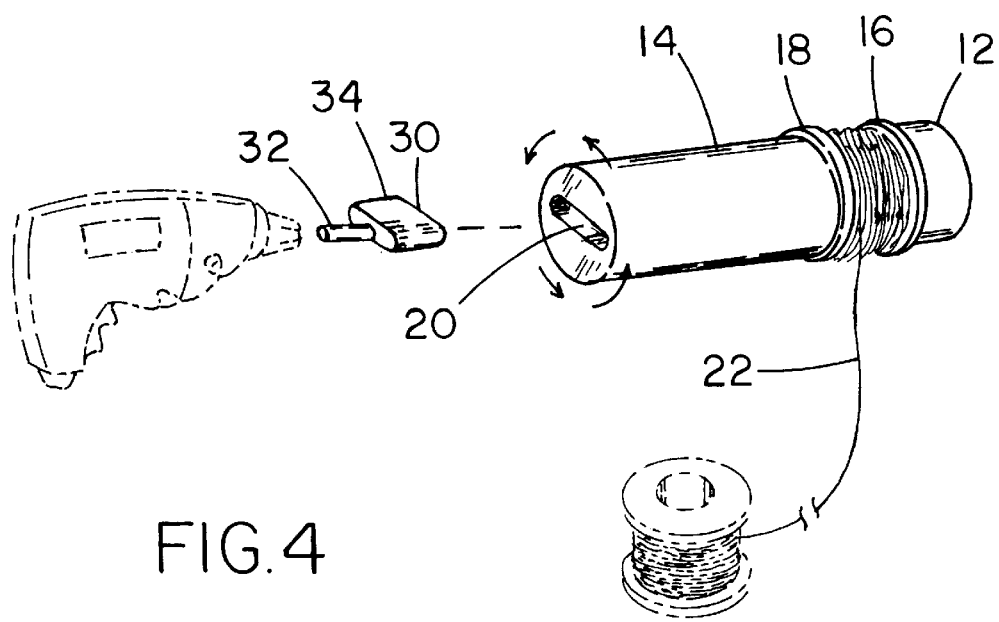
FIG. 4 is a side exploded view of the drill attachment of the present invention in use.

Next provided is a string 22 having a first end connected to the float between the annular flanges. In use, the string is adapted for being reeled about the spool of the float. A weight 24 is included having a planar rectangular configuration. A periphery of the weight is defined by a pair of short end edges with a width equal to that of the spool. Further, a pair of side edges of the periphery of the weight are each equipped with a length equal to a circumference of the float. As shown in FIG. 3, the weight has a hole formed therein adjacent to one of the end edges thereof for being coupled to a second end of the string. The weight is suitably constructed from a deformable lead material.

In operation, the weight serves for maintaining the second end of the string on a floor of a body of water when the string is unreeled. Further, the weight serves for being wrapped about the string when reeled about the spool for maintaining the same in place. As shown in FIGS. 5 & 6, a plurality of hooks are spacedly coupled along a length of the string. With reference still to FIGS. 5 & 6, it is shown that the float of the present invention is adapted to erect upon a fish strike, thereby signaling a fisherman to reel the fishing unit.

FIG. 7 shows a tray 26 having a rectangular configuration with a top face, a bottom face and a thin periphery formed therebetween. The top face of the tray has a matrix of rectangular protrusions 28 formed thereon. Such protrusions are adapted for supporting each of the fishing units by releasably engaging the recesses thereof.

Finally, a drill bit 30 has a rod portion 32 with an inboard end for releasably engaging a drill. A rectangular block portion 34 is integrally coupled to an outboard end of the rod portion for releasably engaging the recess of one of the fishing units. As such, the drill may be used for rotating the fishing units for reeling purposes and further for wrapping new line thereon.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A hands-free fishing system comprising, in combination: at least one fishing unit including:
   a float;
   a string having a first end connected to the float adjacent to one of a pair of ends thereof;
   a weight mounted on a second end of the string;
   at least one hook coupled between the first end and second end of the string; and
   a tray having a matrix of protrusions formed thereon for supporting the at least one fishing unit by releasably engaging a recess thereof.

2. A hands-free fishing system as set forth in claim 1 wherein the weight has a planar configuration and is constructed from a deformable material.

3. A hands-free fishing system as set forth in claim 1 wherein the float has a pair of annular flanges formed thereon for defining a spool about which the string is reeled.

4. A hands-free fishing system as set forth in claim 1 wherein a length of the float is at least 5 times a diameter thereof.

5. A hands-free fishing system as set forth in claim 1 and further including a drill bit having a rod portion with an inboard end for releasably engaging a drill and a block portion integrally coupled to an outboard end of the rod portion for releasably engaging the recess of the at least one fishing unit for rotating the same for reeling purposes.

6. A hands-free fishing system as set forth in claim 1 wherein the tray has a rectangular configuration with a top face, a bottom face and a thin periphery formed therebetween, the matrix of protrusions being formed on the top face of the tray.

7. A hands-free fishing system comprising, in combination: at least one fishing unit including:
   a float having a spool;
   a string having a first end connected to the float adjacent to one of a pair of ends thereof;
   a weight coupled on a second end of the string; and
   at least one hook coupled between the first end and second end of the string;
   wherein the weight is constructed from a deformable material, the weight having a planar rectangular configuration defined by a pair of short end edges with a width equal to that of the spool and a pair of side edges with a length equal to a circumference of the float, the weight having a hole formed therein adjacent to one of the end edges thereof for being coupled to a second end of the string, wherein the weight serves for both maintaining the second end of the string on a floor of a body of water when the string is unreeled and further serves for being wrapped about the string when reeled about the spool for maintaining the same in place.

8. A hands-free fishing system as set forth in claim 7 and further including a tray having a matrix of protrusions formed thereon for supporting a plurality of the fishing units by releasably engaging recesses thereof.

9. A hands-free fishing system as set forth in claim 7 wherein the float has a pair of annular flanges formed thereon for defining the spool about which the string is reeled.

10. A hands-free fishing system as set forth in claim 7 wherein a length of the float is at least 5 times a diameter thereof.

11. A hands-free fishing system as set forth in claim 7 and further including a drill bit having a rod portion with an inboard end for releasably engaging a drill and a block portion integrally coupled to an outboard end of the rod portion for releasably engaging a recess of the at least one fishing unit for rotating the same for reeling purposes.

12. A hands-free fishing system comprising, in combination:
   a plurality of fishing units each including:
      a float with a cylindrical configuration having a pair of closed end faces and a peripheral side wall formed therebetween for defining a hermetically sealed interior space, the float further including a first annular flange integrally coupled to the peripheral side wall adjacent to a first one of the pair of end faces of the float, a second annular flange integrally coupled to the peripheral side wall of the float between a center point of the float and the first annular flange for defining a spool, and a generally rectangular recess formed in a second one of the pair of end faces of the float, wherein a length of the float is at least 5 times a diameter thereof,
      a string having a first end connected to the float between the annular flanges for being reeled about the spool of the float,
      a weight having a planar rectangular configuration defined by a pair of short end edges with a wide equal to that of the spool and a pair of side edges with a length a equal to a circumference of the float, the weight having a hole formed therein adjacent to one of the end edges thereof for being coupled to a second end of the string, wherein the weight serves for both maintaining the second end of the string on a floor of a body of water when the string is unreeled and further serves for being wrapped about the string when reeled about the spool for maintaining the same in place, and
      a plurality of hooks spacedly coupled along a length of the string;
   a tray having a rectangular configuration with a top face, a bottom face and a thin periphery formed therebetween, the top face of the tray having a matrix of rectangular protrusions formed thereon for supporting each of the fishing units by releasably engaging the recesses thereof; and
   a drill bit having a rod portion having an inboard end for releasably engaging a drill and a rectangular block portion integrally coupled to an outboard end of the rod portion for releasably engaging the recess of one of the fishing for rotating the same for reeling purposes.

* * * * *